(12) United States Patent
Parker et al.

(10) Patent No.: US 8,313,787 B2
(45) Date of Patent: Nov. 20, 2012

(54) FLAVOURING COMPOSITION

(75) Inventors: Alan Parker, Metz-Tessy (FR);
Florence Vigouroux Elie, Bernex (CH)

(73) Assignee: Firmenich SA, Geneva (CH)

(*) Notice: Subject to any disclaimer, the term of this patent is extended or adjusted under 35 U.S.C. 154(b) by 298 days.

(21) Appl. No.: 12/598,805

(22) PCT Filed: Apr. 22, 2008

(86) PCT No.: PCT/IB2008/051545
§ 371 (c)(1),
(2), (4) Date: Nov. 4, 2009

(87) PCT Pub. No.: WO2008/142583
PCT Pub. Date: Nov. 27, 2008

(65) Prior Publication Data
US 2010/0119680 A1    May 13, 2010

(30) Foreign Application Priority Data

May 23, 2007  (EP) .................... 07108715

(51) Int. Cl.
*A23L 2/56* (2006.01)
*A23L 1/221* (2006.01)
(52) U.S. Cl. ....................... 426/535; 426/650
(58) Field of Classification Search .......... 426/89, 426/103, 535, 330, 650
See application file for complete search history.

(56) References Cited

U.S. PATENT DOCUMENTS

| 3,730,728 | A | * | 5/1973 | Patashnik et al. | 426/1 |
| 3,940,500 | A | | 2/1976 | Sortwell, III | 426/535 |
| 4,015,025 | A | | 3/1977 | Szczesniak | 426/575 |
| 4,689,235 | A | * | 8/1987 | Barnes et al. | 426/89 |
| 5,958,502 | A | | 9/1999 | Fulger et al. | 426/650 |
| 6,287,603 | B1 | | 9/2001 | Prasad et al. | 424/489 |
| 2002/0115729 | A1 | | 8/2002 | Yang | 514/772.5 |

FOREIGN PATENT DOCUMENTS

| EP | 1 084 625 A2 | 3/2001 |
| WO | WO 95/00040 A1 | 1/1995 |

OTHER PUBLICATIONS

NPL "HPMC Methoxyl substitute".*
NPL "HPMC Methoxyl substitute" Way back machine date is May 1, 2004. [N.B. The above citation was submitted before, but the date was not mentioned. Therefore, date is mentioned here].*
International Search Report, application No. PCT/IB2008/051545, mailed Oct. 15, 2008.
Pangborn et al., "Effect of Hydrocolloids and Viscosity on Flavor and Odor Intensities of Aromatic Flavor Compounds," Journal of Texture Studies, vol. 4, pp. 467-482 (1974).

* cited by examiner

*Primary Examiner* — Humera Sheikh
*Assistant Examiner* — Bhaskar Mukhopadhyay
(74) *Attorney, Agent, or Firm* — Winston & Strawn LLP

(57) ABSTRACT

A flavoring composition for a minced-fish product comprises from 0.1 to 30 wt % of dimethyl sulphide, based on the total weight of the flavoring composition, and a cellulose ether derivative, wherein the weight ratio of dimethyl sulphide to cellulose ether derivative is 8:1 or less and the cellulose ether derivative comprises at least 2.5% by weight of hydroxyalkyl substituents.

9 Claims, No Drawings

FLAVOURING COMPOSITION

This application is a 371 filing of International Patent Application PCT/IB2008/051545, filed Apr. 22, 2008.

TECHNICAL FIELD

The present invention relates to a flavouring composition and more particularly relates to a flavouring composition comprising dimethyl sulphide and a cellulose ether derivative.

BACKGROUND AND PRIOR ART

Frozen minced fish, which is commonly referred to as "frozen surimi", is typically produced by the process in which fish meat, such as pollack, is firstly minced, the minced fish is subjected to two or more washes with fresh water to remove undesirable fish odours, a small amount of common salt is added to the fresh water in the final wash step, the skin is removed where necessary, a screw-press is used to remove water from the product, sugars or sugar alcohols are mixed with the dried product and, finally, the product is packed and stored under refrigeration at −20° C. to −40° C.

One problem with this process is that the repeated washing steps remove not only undesirable flavours but also many of the desirable flavours. Therefore, replacement flavours must typically be added back into the surimi to achieve the desired flavour profile.

Flavour compositions that can be used for adding back the desired flavour profile contain dimethyl sulphide (referred to herein as "DMS") as a major component because it delivers a desirable sulphury, vegetal, crab-like top note.

However, DMS is a volatile component that evaporates undesirably quickly upon storage such that product containing it lose a significant part of the crab-like tope note.

Additionally, DMS is often incompatible with various other ingredients used for adding back flavour into surimi products. This results in the presence of an undesirable film, comprising the DMS, which is visible on the surface of the flavour composition.

One approach to stabilize DMS in surimi products is to generate an emulsion of the DMS, which is hydrophobic, with certain hydrophilic ingredients. However, emulsions are intrinsically unstable, especially upon storage over longer periods and/or at elevated temperatures and, once the emulsion separates, the known problems identified above can recur.

Furthermore, emulsion manufacture is often an expensive and time-consuming process requiring harsh processing conditions, such as high pressure, high shear or both This is undesirable since the large amount of heat generated by such processing risks driving off the volatile DMS component.

Thus, it is an objective of the present invention to address one or more of the abovementioned problems and/or to provide one or more consumer desirable benefits.

We have now found that the addition of certain cellulose ether derivatives at the correct dosage can address one or more of these problems.

The use of hydroxypropyl methyl cellulose has been described in "Surimi and Surimi Seafood", Second Edition by Jae W. Park, publisher: Food Science and Technology) as an ingredient which can improve the texture of surimi. However, this requires very high levels of the ingredient. In the present invention, much lower levels of the cellulose ether derivative are required in order to stabilise the flavouring composition comprising DMS.

In U.S. Pat. No. 5,958,502 (Fulger et al), there is described a process for incorporating a volatile component into a matrix. The volatile component can be any component having a low boiling point, such as DMS and the matrix can be selected from a large number of materials, including cellulose ether derivative. The product is a glassy carbohydrate matrix and there is no disclosure or suggestion of using DMS together with a specific cellulose ether derivative.

In Pangborn R M et al., Journal of Texture Studies, vol. 4, No. 4, 1974, pages 467 to 482, table 1 on page 468 discloses a composition comprising, amongst other ingredients, DMS and hydroxpropylcellulose. The amount of DMS is at most 0.0006 g/100 ml water, which is far below the amount used according to the present invention.

SUMMARY OF THE INVENTION

Accordingly, the present invention provides a flavouring composition for a minced-fish product comprising:
(a) 0.1 to 30 wt % of dimethyl sulphide, based on the total weight of the flavouring composition, and
(b) a cellulose ether derivative,
wherein the weight ratio of (a) to (b) is 8:1 or less and the cellulose ether derivative comprises at least 2.5% by weight of hydroxyalkyl substituents.

The invention further provides a minced-fish product comprising the flavouring composition.

In a further aspect, the invention provides the use of a cellulose ether derivative in a flavouring composition comprising dimethyl sulphide to stabilise the composition.

In yet another aspect, the invention provides a process for the preparation of a stable flavouring composition comprising the step of mixing:
(a) from 0.1 to 30 wt % based on the total weight of the flavouring composition of dimethyl sulphide together with
(b) a cellulose ether derivative comprising at least 2.5% by weight of hydroxyalkyl substituents,
wherein the weight ratio of (a) to (b) is 8:1 or less.

DETAILED DESCRIPTION OF THE INVENTION

The present invention relates to a flavouring composition comprising DMS.

DMS is a flavouring ingredient of formula $(CH_2)_2S$ that, together with other seafood flavouring ingredients, is used in minced-fish products to provide a characteristic sea-food aroma and taste.

It is a volatile compound having a boiling point of 83° C. and is effective at delivering the desired aroma in minced-fish products, even at very low levels. However, when present in amounts significantly above the threshold detection level, it is undesirably pungent. For this reason, it is vital that the amount of DMS does not exceed 30 wt %, based on the total weight of the flavouring composition. Preferably, the amount of DMS is from 0.1 to 15 wt %, more preferably from 0.5 to 12 wt %, most preferably from 1 to 8 wt % based on the total weight of the flavouring composition.

Cellulose Ether Derivative

The flavouring composition of the invention comprises a small quantity of a cellulose ether derivative. It has been found that this material stabilises the dimethyl sulphide in the composition in spite of the incompatibility of DMS with other flavouring components. It is believed that the DMS is typically unstable because of the aqueous environment of the flavour composition and that the cellulose ether derivative stabilises the DMS by encouraging emulsification to provide, in the dispersed phase, the DMS. The continuous phase is thus aqueous, typically comprising the water-soluble flavour components.

Surprisingly, unlike other emulsion aids, the cellulose ether derivative achieves stability over a long period. For instance, lecithin can be used to form an emulsion of DMS but the emulsion is typically observed to coalesce after only 24 hours storage at 20° C.

The cellulose ether derivative is preferably a hydroxy alkyl cellulose comprising one or more pendant alkyl groups.

Preferred alkyl groups include C1 to $C_5$, more preferably $C_2$ to $C_4$ alkyl chains. The alkyl chain may be branched or unbranched.

The percentage by weight of hydroxyalkyl substituent is preferably greater than 2.5, more preferably from 3 to 20, more preferably from 4 to 18, most preferably from 5 to 15%, e.g. from 7 to 12%.

It has been found that where the amount of hydroxyalkyl substituent is below 2.5 wt %, a less stable DMS emulsion is formed. For this reason, the cellulose ether derivative is not methyl cellulose since this material has been found not to provide the desired emulsion characteristics.

It has been found through experimentation that hydroxyalkyl methyl cellulose is highly preferred since the DMS emulsions formed using this material are highly stable even upon long term storage at elevated temperatures. Most preferably, the alkyl group is a propyl moiety.

Where the cellulose ether derivative is hydroxyalkyl methyl cellulose, the percentage by weight of methoxyl substituent is preferably greater than 25, more preferably it is from 25 to 35, even more preferably from 26 to 34, most preferably from 28 to 30.

The modified cellulose is preferably present in an amount of from 1 to 20 wt %, more preferably from 1 to 15 wt %, most preferably from 1 to 7 wt %, e.g. 1 to 4 wt %, based on the total weight of the flavouring composition.

Surprisingly, at these very low levels excellent retention of DMS is achieved. Advantageously, due to the high retention level upon storage achieved in this composition, the higher amounts of DMS conventionally required to compensate for the evaporation of the DMS during storage are no longer required. Moreover, such levels are found to deliver an overpowering sulphury note undesirable to consumers. Thus, the incorporation of a small amount of the cellulose ether derivative also enables a significant reduction in the amount of DMS required.

In order to provide an excellent emulsion, the weight ratio of DMS to cellulose ether derivative is preferably 8:1 or less, more preferably in the range of from 1:2 to 8:1, even more preferably from 1:1 to 5:1, most preferably from 2:1 to 4:1.

When the weight ratio is above 8:1, it is found that the emulsified DMS does not remain stable upon storage.

Below about 1:2, the viscosity of the mixture is extremely high and is significantly more difficult to process, for instance, pumping the mixture becomes problematic.

Thus, it is preferred that the viscosity of the flavouring composition is less than 1800 mPa·s at 100 $s^{-1}$ and 20° C.

It has also been found that if the viscosity of the flavouring composition is too low, the risk of creaming of the droplets of DMS increases. Therefore, the viscosity should be sufficient to avoid this. Accordingly, it is preferred that the viscosity of the flavouring composition is greater than 900 mPa·s at 100 $s^{-1}$ and 20° C.

Other Ingredients

The flavouring composition typically comprises additional flavouring ingredients suitable for use in an aqueous medium and for providing crab-like notes. For instance, fish paste or shrimp paste are well known ingredients suitable for use in a minced-fish product.

Salt, especially sodium chloride, is typically added to the flavour composition. The amount of salt present should generally be less than 1% by weight based on the total weight of the flavour composition, more preferably less than 0.7%. It has been found that the presence of salt reduces the solubility of the cellulose ether derivative and so adversely affects its ability to stabilise the DMS.

In order to improve emulsification, a solvent, especially an alcohol, can be in the composition. Particularly preferred are ethanol and/or propylene glycol. Typically these can be used in an amount of from 5 to 50% by weight based on the total weight of the flavouring composition, more preferably from 10 to 35%, most preferably from 20 to 30%.

The invention will now be described with reference to the following examples. It is to be understood that the examples are illustrative of the invention and that the scope of the invention is not limited thereto.

All amounts are % by weight unless otherwise indicated.

EXAMPLES

Example 1

Preparation of Crab Flavour Using Lecithin

A crab flavour was prepared by shearing together the following ingredients at 60° C. until the product appeared homogenous.

TABLE 1

| Ingredient | Amount (wt %) |
|---|---|
| Crab topnote* | 12.0 |
| Lecithin | 0.5 |
| Ethanol | 5.0 |
| Glycerin | 40.0 |
| Shrimp paste | 5.0 |
| Crab paste | 5.0 |
| Xanthan gum | 0.12 |
| Propylene glycol | 9.05 |
| Water | 23.3 |

*58.3% DMS, 34.8% ethanol, 6.9% propylene glycol

The composition was stored at 20° C. After 24 hours, a film of DMS was visible on the surface of the flavour. This demonstrates that the DMS component of the flavour is unstable when emulsified using a conventional emulsification agent.

Example 2

Preparation of a Crab Flavour Containing a Cellulose Ether Derivative

Various crab flavours were prepared using cellulose ether derivatives given in the table below.

TABLE 2

| Cellulose Ether Derivative | % methoxyl | % hydroxypropyl |
|---|---|---|
| Grade A* | 27.5-31.5 | 0 |
| Grade E* | 28.0-30.0 | 7.0-12.0 |
| Grade K* | 19.0-24.0 | 7.0-12.0 |

*Methocel ® (ex Dow Chemicals)

Each cellulose ether derivative was incorporated into the following flavouring composition:

TABLE 3

| Ingredient | Composition 1 (wt %) | Composition 2 (wt %) |
|---|---|---|
| Crab topnote* | 12 | 12 |
| Crab paste** | 5 | — |
| Shrimp paste** | — | 5 |
| Propylene glycol | 25 | 25 |
| Cellulose ether derivative*** | 1.5 | 1.5 |
| Citric acid | 0.2 | 0.2 |
| Water | 51.3 | 51.3 |

*see table 1
**72% crab or shrimp seafood liquid flavour respectively, 10% salt and 18% native tapioca starch
***grade A, E or K respectively The compositions were prepared by firstly dispersing the cellulose ether derivative in the propylene glycol. The water was then added with stirring until the cellulose ether derivative had completely dissolved, after which the citric acid was incorporated. The crab topnote was then added with further stirring followed by the crab paste or shrimp paste. The mixture was stirred until a homogeneous solution formed. All mixing was performed under very low shear conditions and at room temperature.

The resulting flavour compositions were stored at room temperature for 1 week, after which time the stability of the compositions was observed. The results are given in the following table.

TABLE 4

| | Composition 1 | Composition 2 |
|---|---|---|
| Grade A | Film visible on surface | Film visible on surface |
| Grade E | Stable/no film | Stable/no film |
| Grade K | Film visible on surface | Film visible on surface |

Example 3

Effect of Varying the Amount of Cellulose Ether Derivative

A crab flavour according to composition 1 in table 3 was prepared using grade E except that the cellulose ether level was 0.8% and the propylene glycol level was 25.7%.

The composition formed a cream layer upon storage demonstrating that the weight ratio of DMS to cellulose ether should be about 8:1 or less.

The results demonstrate that the compositions according to the invention can be prepared simply and inexpensively and avoid the need for harsh processing conditions.

What is claimed is:

1. In an aqueous flavouring composition that includes dimethyl sulphide in an amount of from 0.1 to 30 wt % based on the total weight of the flavouring composition, the improvement which comprises stabilizing the composition by providing a cellulose ether derivative comprising at least 2.5% by weight of hydroxyalkyl substituents, wherein the hydroxyalkyl methyl cellulose comprises from 25% to 35% by weight of methoxyl substituents, with the dimethyl sulphide and hydroxyalkyl cellulose present in a weight ratio of from 1:2 to 6:1, wherein the composition has a viscosity of between 900 and 1800 mPa.s at $100s^{-1}$ and 20° C.

2. A process for the preparation of a stable flavouring composition comprising the step of mixing:
(a) from 0.1 to 30 wt % based on the total weight of the flavouring composition of dimethyl sulphide together with
(b) a cellulose ether derivative comprising at least 2.5% by weight of hydroxyalkyl substituents, wherein the hydroxyalkyl methyl cellulose comprises from 25% to 35% by weight of methoxyl substituents,
wherein components (a) and (b) are present in a weight ratio of from 1:2 to 6:1 and the composition has a viscosity of between 900 and 1800 mPa·s at $100 \, s^{-1}$ and 20° C.

3. An aqueous flavouring composition for a minced-fish product comprising:
(a) 0.1 to 30 wt % of dimethyl sulphide, based on the total weight of the flavouring composition, and
(b) a cellulose ether derivative comprising at least 2.5% by weight of hydroxyalkyl substituents, wherein components (a) and (b) are present in a weight ratio of (a):(b) of from 1:2 to 6:1 and the composition has a viscosity of between 900 and 1800 mPa·s at $100 \, s^{-1}$ and 20° C.

4. The composition of claim 3, wherein the cellulose ether derivative is a hydroxyalkyl methyl cellulose.

5. The composition of claim 3, wherein the cellulose ether derivative is hydroxypropyl methyl cellulose.

6. The composition of claim 3, wherein the hydroxyalkyl methyl cellulose comprises from 25% to 35% by weight of methoxyl substituents.

7. The composition of claim 3, in the form of an emulsion and further wherein the dimethyl sulphide is in the dispersed phase.

8. The composition of claim 3, wherein the composition comprises less than 1% by weight, based on the total weight of the flavouring composition, of sodium chloride.

9. A minced-fish product comprising minced fish and the aqueous flavouring composition of claim 3.

* * * * *